US012350858B2

(12) United States Patent
Yang et al.

(10) Patent No.: US 12,350,858 B2
(45) Date of Patent: Jul. 8, 2025

(54) MANUFACTURING METHOD OF COMPOSITE PANEL

(71) Applicant: CAROL YOUNG CORPORATION, Taipei (TW)

(72) Inventors: Chang-Jen Yang, Taipei (TW); Pao-Ching Yang, Taipei (TW); Chun-Ting Yang, Taipei (TW)

(73) Assignee: CAROL YOUNG CORPORATION, Taipei (TW)

( * ) Notice: Subject to any disclaimer, the term of this patent is extended or adjusted under 35 U.S.C. 154(b) by 337 days.

(21) Appl. No.: 18/154,731

(22) Filed: Jan. 13, 2023

(65) Prior Publication Data

US 2024/0139988 A1 May 2, 2024

(30) Foreign Application Priority Data

Nov. 1, 2022 (TW) ................................ 111141507

(51) Int. Cl.
*B27D 1/08* (2006.01)
*B27M 1/08* (2006.01)
*B27M 3/00* (2006.01)

(52) U.S. Cl.
CPC ................ *B27D 1/08* (2013.01); *B27M 1/08* (2013.01); *B27M 3/0013* (2013.01)

(58) Field of Classification Search
CPC ......... B27D 1/08; B27M 1/08; B27M 3/0013; B32B 38/0004; B32B 3/30; E04C 2/32
See application file for complete search history.

(56) References Cited

U.S. PATENT DOCUMENTS

2012/0156435 A1* 6/2012 Yang ...................... B32B 21/04
428/167

OTHER PUBLICATIONS

Bent's Woodworking—"How to Apply Edge Banding // Woodworking Tips". YouTube Video uploaded Jun. 3, 2018. Accessed at <https://www.youtube.com/watch?v=Sfp8wLcALN0> (Year: 2018).*
Zaffaroni—"Zaffaroni—Longitudinal "V-Grooving" machine and "V-Groovers" series FML." YouTube Video uploaded Dec. 13, 2016. Accessed at <https://www.youtube.com/watch?v=YY8bZySSSUw> (Year: 2016).*

* cited by examiner

*Primary Examiner* — Alex B Efta
*Assistant Examiner* — Alexander S Wright
(74) *Attorney, Agent, or Firm* — Maschoff Brennan

(57) ABSTRACT

Disclosed is a manufacturing method of a composite panel, comprising: a providing step of providing a flexible sheet; an attaching step of forming a lamellar structure by attaching at least one lamellar board to cover the flexible sheet; and a cutting step of cutting a plurality of longitudinal grooves in the lamellar structure layer to form a plurality of lamellar strips, thereby obtaining the composite panel that is able to be bent laterally into a curved configuration.

5 Claims, 5 Drawing Sheets

MANUFACTURING METHOD OF COMPOSITE PANEL

FIELD OF THE INVENTION

The present invention relates to a composite panel, and more particularly relates to a manufacturing method of a composite panel.

BACKGROUND OF THE INVENTION

In the decoration of home buildings and furniture, panels are often attached to outer surfaces of walls, columns and furniture to make them aesthetically pleasing or to provide waterproofing, sound insulation, heat insulation, and so on. One type of the panels used is a composite panel formed by attaching a plurality of parallel strips to a base sheet. Such composite panels can be bent by virtue of grooves between the strips to facilitate attachment to non-planer configurations such as curved art wall, edged corners, and round columns or poles.

In a conventional art, the composite panel is manufactured by roughly cutting a raw material into strips of approximate size, then finely cutting the strips into a precise shape, and then attaching the strips with the precise shape to a sheet one by one. However, since the long and thin strips tend to twist, shift and slide during and after cut, it is difficult to process them and may cause a problem of uneven processed shapes. On the other hand, attaching the strips to the sheet one by one is not only time consuming, but also prone to inconsistencies in alignment spacing and parallelism of the strips.

SUMMARY OF THE INVENTION

Accordingly, one objective of the present invention is to provide a manufacturing method of a composite panel so as to solve the problems in prior art.

In order to overcome the technical problems in prior art, the present invention provides a manufacturing method of a composite panel, comprising in sequence: a providing step of providing a flexible sheet, wherein the flexible sheet has an attachment surface; an attaching step of attaching at least one lamellar board to cover the attachment surface of the flexible sheet so as to form a lamellar structure layer on the attachment surface of the flexible sheet; and a cutting step of cutting a plurality of longitudinal grooves parallel to each other in the lamellar structure layer such that the plurality of longitudinal grooves are separated to each other to form the lamellar structure layer as a plurality of lamellar strips which are separate and parallel to each other such that the composite panel formed by the flexible sheet and the plurality of lamellar strips is able to be bent laterally into a curved configuration by virtue of the plurality of longitudinal grooves and flexibility of the flexible sheet.

In one embodiment of the present invention, the manufacturing method is provided, wherein in the providing step, the flexible sheet is a paper sheet, a fabric sheet, a plastic sheet, or a metal sheet.

In one embodiment of the present invention, the manufacturing method is provided, wherein in the attaching step, the lamellar structure layer is formed by a plurality of the lamellar boards which are arranged side by side in a lateral direction, and each of the lamellar boards has a longitudinal length not less than that of the attachment surface of the flexible sheet.

In one embodiment of the present invention, the manufacturing method is provided, wherein in the attaching step, outer surrounding edges of the lamellar structure layer extend beyond that of the attachment surface of the flexible sheet.

In one embodiment of the present invention, the manufacturing method is provided further comprising, after the attaching step, a trimming step of trimming the lamellar structure layer and the flexible sheet to a corresponding outer edge size.

In one embodiment of the present invention, the manufacturing method is provided, wherein in the attaching step, the lamellar board is a wood board, a fire-resistant board, or a fiber board.

In one embodiment of the present invention, the manufacturing method is provided, wherein in the cutting step, two or more of the longitudinal grooves are cut simultaneously in a single cutting process.

In one embodiment of the present invention, the manufacturing method is provided, wherein in the cutting step, each of the lamellar strips has a trapezoidal cross-sectional shape, a semicircular cross-sectional shape, a trapezoidal cross-sectional shape with chamfers, or a rectangular cross-sectional shape with chamfers.

In one embodiment of the present invention, the manufacturing method is provided further comprising, after the attaching step and before the cutting step, a flattening step of flattening an upper surface of the lamellar structure layer to a basic flat surface to facilitate the cutting step.

With the technical means adopted by the present invention, the manufacturing method of the present invention is to form the lamellar structure layer by attaching at least one lamellar board to the flexible sheet, and then to form the plurality of lamellar strips from the lamellar structure layer by cutting. In this way, the manufacturing method of the present invention does not require the time and effort of attaching the lamellar strips to the flexible sheet one by one, thus effectively improving the manufacturing efficiency. Moreover, since the cutting step in the present invention is performed on the lamellar structure layer which has been fixed on the flexible sheet, the problem of twisting, shifting and sliding will be avoided during the cutting step. In addition, there is no need to worry about the inconsistencies in alignment spacing and parallelism of the lamellar strips resulting from the conventional method of attaching the lamellar strips to the flexible sheet one by one.

DETAILED DESCRIPTION OF THE PREFERRED EMBODIMENTS

The preferred embodiments of the present invention are described in detail below with reference to FIG. 1 to FIG. 8. The description is used for explaining the embodiments of the present invention only, but not for limiting the scope of the claims.

Figure 1:
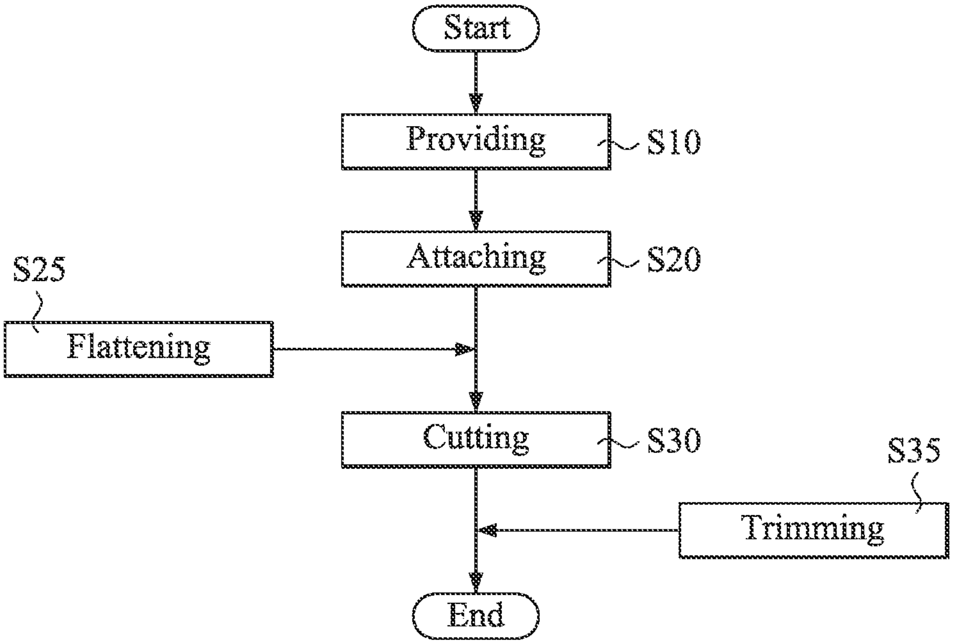
FIG. 1 is a schematic flowchart of a manufacturing method of a composite panel according to one embodiment of the present invention.

As shown in FIG. 1, a manufacturing method of a composite panel according to one embodiment of the present invention comprises in sequence: a providing step S10, an attaching step S20 and a cutting step S30.

Figure 2:
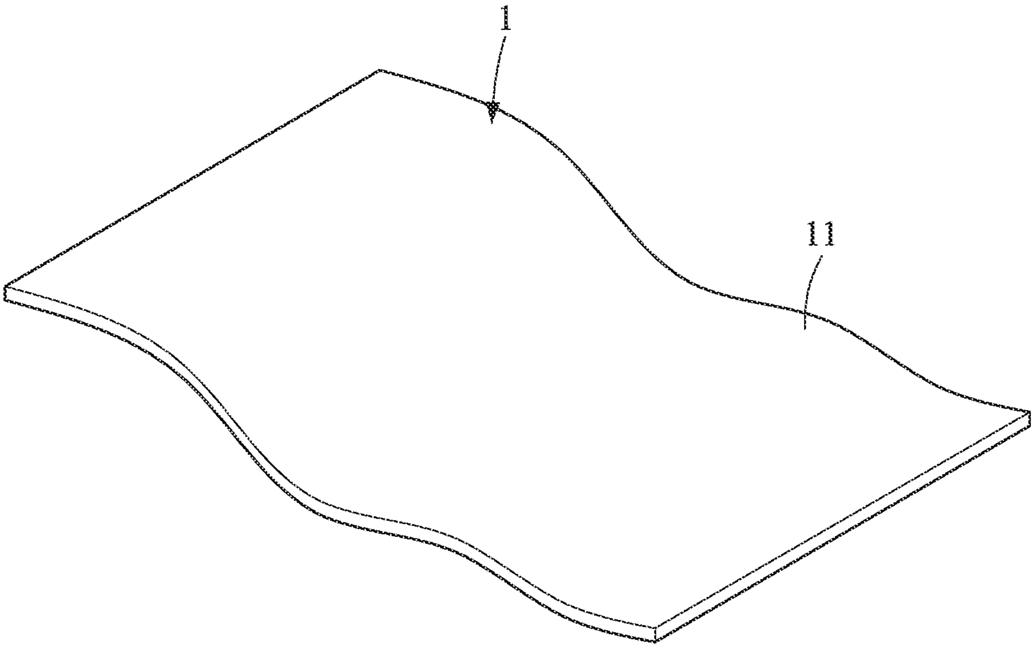
FIG. 2 is a schematic diagram illustrating a flexible sheet used in the manufacturing method according to the embodiment of the present invention.

As shown in FIG. 1 and FIG. 2, in the providing step S10, a flexible sheet 1 is provided, wherein the flexible sheet 1 has an attachment surface 11.

Specifically, the flexible sheet 1 may be a paper sheet, a fabric sheet, a plastic sheet, a metal sheet, or other composite material flexible sheet. The fabric sheet may be, for example, woven fabric or non-woven fabric, both the paper sheet and the fabric sheet may be reinforced with plastic, natural rubber, environmentally friendly glue, fireproof glue, etc., and the metal sheet may be, for example, aluminum. However, the present invention is not limited to this, and the flexible sheet 1 may be made of other materials.

Figure 3:
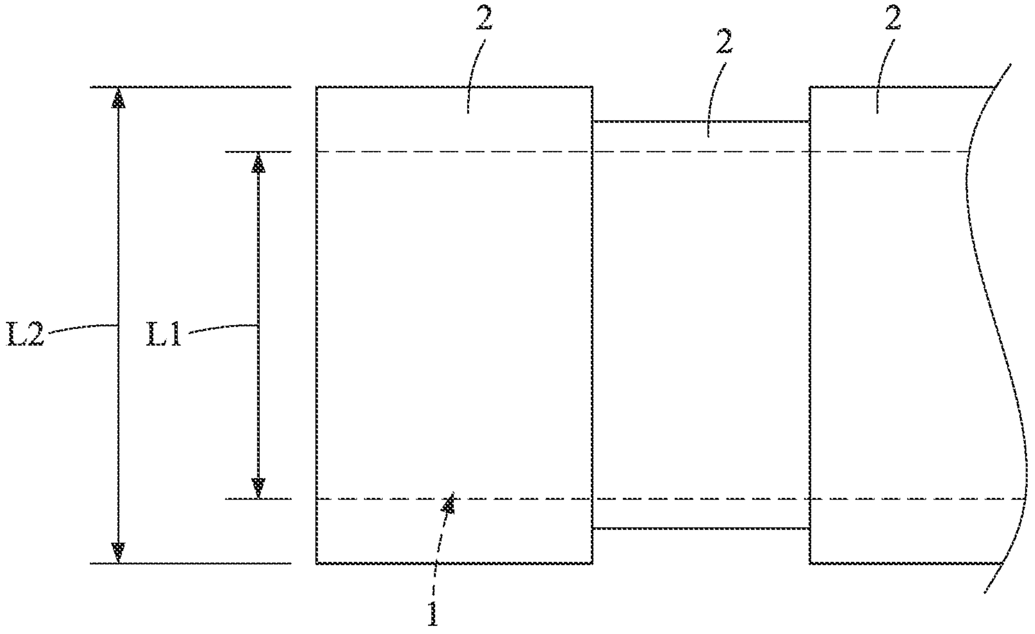
FIG. 3 is a schematic diagram illustrating a step of attaching lamellar boards to cover the flexible sheet in the manufacturing method according to the embodiment of the present invention.
Figure 4:
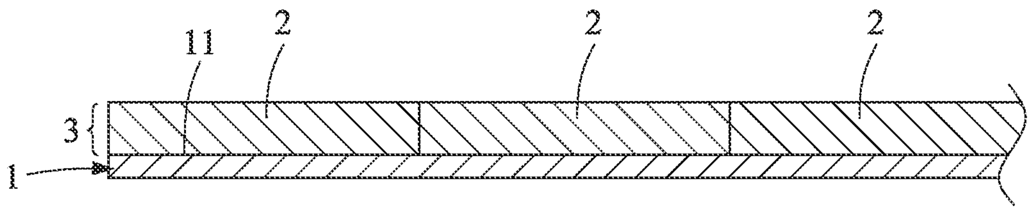
FIG. 4 is a schematic diagram illustrating a step of forming a lamellar structure layer on the flexible sheet in the manufacturing method according to the embodiment of the present invention.

As shown in FIG. 1, FIG. 3 and FIG. 4, in the attaching step S20 performed after the providing step S10, at least one lamellar board 2 is attached to cover the attachment surface 11 of the flexible sheet 1 so as to form a lamellar structure layer 3 on the attachment surface 11 of the flexible sheet 1.

Specifically, the lamellar board 2 is preferably a large-area sheet or board that has not been cut into strips. The lamellar board 2 may be a wood board, a fire-resistant board, or a fiberboard, such as a fireproof board, a solid wood board, a medium density fiberboard (MDF), a high density fiberboard (HDF), and other environmentally friendly recycled board. However, the present invention is not limited to this, and the lamellar board 2 may be made of other materials.

Figure 5:
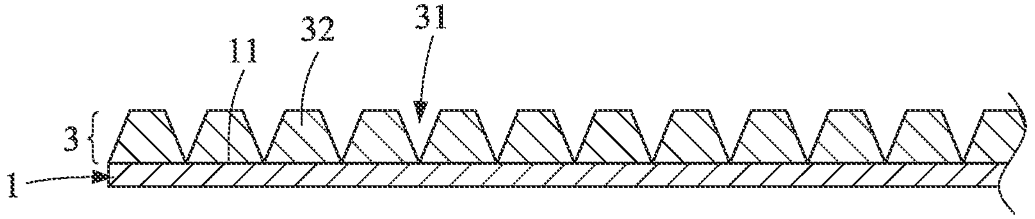
FIG. 5 is a schematic diagram illustrating one composite panel manufactured by the manufacturing method according to the embodiment of the present invention.
Figure 6:
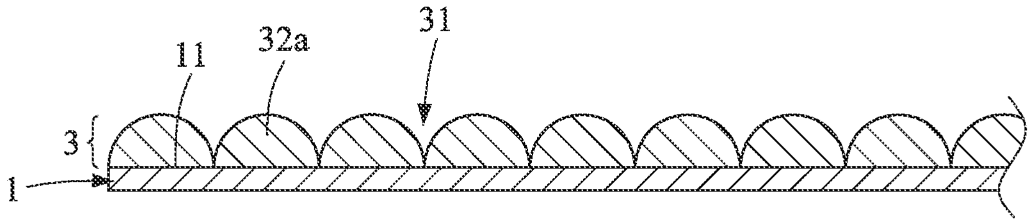
FIG. 6 is a schematic diagram illustrating one composite panel manufactured by the manufacturing method according to the embodiment of the present invention.
Figure 7:
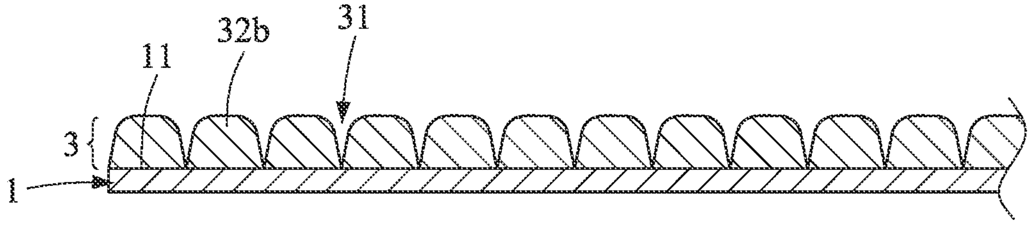
FIG. 7 is a schematic diagram illustrating one composite panel manufactured by the manufacturing method according to the embodiment of the present invention.

As shown in FIG. 5 to FIG. 7, in the cutting step 30 performed after the attaching step S20, a plurality of longitudinal grooves 31 are cut parallel to each other in the lamellar structure layer 3 such that the plurality of longitudinal grooves 31 are separated to each other to form the lamellar structure layer 3 as a plurality of lamellar strips 32 which are separate and parallel to each other such that the composite panel formed by the flexible sheet 1 and the plurality of lamellar strips 32 is able to be bent laterally into a curved configuration by virtue of the plurality of longitudinal grooves 31 and flexibility of the flexible sheet 1.

Specifically, the cutting step S30 may be performed using various cutting processes, such as milling. As shown in FIG. 5 to FIG. 7, in the cutting step S30, each of the lamellar strips may have a trapezoidal cross-sectional shape (e.g., the lamellar strips 32 as shown in FIG. 5), a semicircular cross-sectional shape (e.g., lamellar strips 32*a* as shown in FIG. 6), or a trapezoidal cross-sectional shape with chamfers (e.g., lamellar strips 32*b* as shown in FIG. 7). However, the present invention is not limited to this, and the lamellar strips may have other cross-sectional shapes, for example, a rectangular cross-sectional shape with chamfers.

Figure 8:
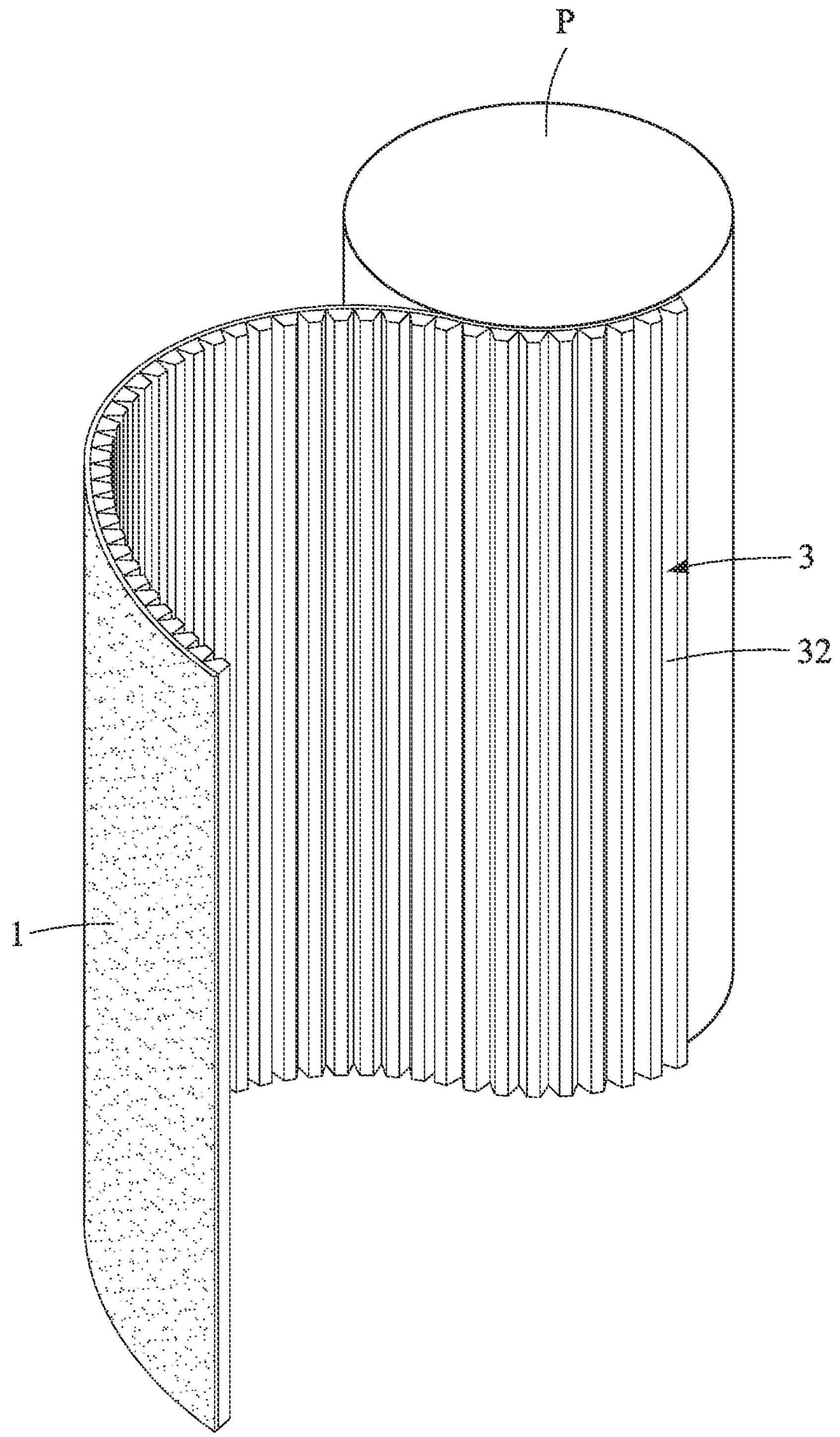
FIG. 8 is a schematic diagram illustrating the composite panel manufactured by the manufacturing method according to the embodiment of the present invention when in use.

As shown in FIG. 8, the composite panel manufactured by the manufacturing method according to the embodiment of the present invention can be bent laterally into the curved configuration so that it can be easily attached to a non-planar configuration such as a column P.

With the technical means mentioned above, the manufacturing method of the present invention is to form the lamellar structure layer 3 by attaching at least one lamellar board 2 to the flexible sheet 1, and then to form the plurality of lamellar strips 32 from the lamellar structure layer 3 by cutting. In this way, the manufacturing method of the present invention does not require the time and effort of attaching the lamellar strips 32 to the flexible sheet 1 one by one, thus effectively improving the manufacturing efficiency. Moreover, since the cutting step S30 in the present invention is performed on the lamellar structure layer 3 which has been fixed on the flexible sheet 1, the problem of twisting, shifting and sliding will not occur easily during the cutting step S30, and there is no need to worry about the inconsistencies in alignment spacing and parallelism of the lamellar strips 32 resulting from the conventional method of attaching the lamellar strips to the flexible sheet one by one.

Preferably, as shown in FIG. 3, in the manufacturing method according to one embodiment of the present invention, in the attaching step S20, the lamellar structure layer 3 is formed by a plurality of the lamellar boards 2 which are arranged side by side in a lateral direction, and each of the lamellar boards 2 has a longitudinal length L2 not less than a longitudinal length L1 of the attachment surface 11 of the flexible sheet 1. In this way, the surface pattern and color of the lamellar structure layer 3 can be made continuous and consistent in the longitudinal direction, and the gap at the junction between the lamellar boards 2 can be prevented from extending in a transverse direction of the lamellar structure layer 3. Therefore, the lamellar strips 32 formed in the longitudinal direction by the cutting step S30 can be more aesthetically pleasing because of the continuity and consistency of the overall surface pattern and color, and can have a better strength structure because they are not divided by the gap extending in the transverse direction.

Preferably, as shown in FIG. 3, in the manufacturing method according to one embodiment of the present invention, in the attaching step S20, outer surrounding edges of the lamellar structure layer 3 extend beyond that of the attachment surface 11 of the flexible sheet 1. In this way, it is easy to ensure that the attachment surface 11 of the flexible sheet 1 is completely covered by the lamellar structure layer 3, and it is possible to save the additional time spent on precisely aligning the outer surrounding edges of the lamellar boards 2 with that of the attachment surface 11 of the flexible sheet 1 during attachment.

Preferably, as shown in FIG. 1, in the case that the outer surrounding edges of the lamellar structure layer 3 extend beyond that of the attachment surface 11 of the flexible sheet 1, the manufacturing method of the present invention further comprises, after the attaching step S20, a trimming step S35 of trimming the lamellar structure layer 3 and the flexible sheet 1 to a corresponding outer edge size. It should be noted that although in the embodiment, the trimming step S35 is performed after the cutting step S30, the present invention is not limited to this, and the trimming step S35 may also be performed after the attaching step S20 and before the cutting step S30.

Preferably, as shown in FIG. 1 and FIG. 5, in the manufacturing method according to one embodiment of the present invention, in the cutting step S30, two or more of the longitudinal grooves 31 are cut simultaneously in a single cutting process. By cutting the longitudinal grooves 31 simultaneously in the single cutting process, the negative effects on the alignment spacing and parallelism of the longitudinal grooves 31 due to the difference in the environment and the parameter conditions between different cutting processes can be further reduced, and therefore the lamellar strips 32 can be obtained with a neater arrangement and better parallelism.

Preferably, as shown in FIG. 1 and FIG. 4, in the manufacturing method according to one embodiment of the present invention, the manufacturing method of the present invention further comprises, after the attaching step S20 and before the cutting step S30, a flattening step S25 of flattening an upper surface of the lamellar structure layer 3 to a basic flat surface to facilitate the cutting step S30. Specifically, since the lamellar boards 2 used in the attaching step S20 may be of uneven thickness and unequal thickness to each other, by performing the flattening step S25, the upper surface of the lamellar structure layer 3 can be flattened in the basic flat surface with a uniform height in advance so as to facilitate the subsequent cutting of the lamellar structure layer 3 in the cutting step S30. However, the present invention is not limited to this, and the flattening step S25 may be omitted with the different cutting method used in the cutting step S30 without materially affecting the cutting effect of the cutting step S30.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A manufacturing method of a composite panel, comprising in sequence:

a providing step of providing a flexible sheet, wherein the flexible sheet has an attachment surface;

an attaching step of attaching at least one lamellar board to cover the attachment surface of the flexible sheet so as to form a lamellar structure layer on the attachment surface of the flexible sheet; and a cutting step of cutting a plurality of longitudinal grooves parallel to each other in the lamellar structure layer such that the plurality of longitudinal grooves are separated to each other to form the lamellar structure layer as a plurality of lamellar strips which are separate and parallel to each other such that the composite panel formed by the flexible sheet and the plurality of lamellar strips is able to be bent laterally into a curved configuration by virtue of the plurality of longitudinal grooves and flexibility of the flexible sheet, wherein in the attaching step, the lamellar structure layer is formed by a plurality of the lamellar boards which are arranged side by side in a lateral direction, and each of the lamellar boards has a longitudinal length not less than that of the attachment surface of the flexible sheet, and outer surrounding edges of the lamellar structure layer extend beyond that of the attachment surface of the flexible sheet, wherein the manufacturing method further comprises, after the attaching step, a trimming step of trimming the lamellar structure layer and the flexible sheet to a corresponding outer edge size, and wherein the manufacturing method further comprises, after the attaching step and before the cutting step, a flattening step of flattening an upper surface of the lamellar structure layer to a basic flat surface to facilitate the cutting step.

2. The manufacturing method as claimed in claim 1, wherein in the providing step, the flexible sheet is a paper sheet, a fabric sheet, a plastic sheet, or a metal sheet.

3. The manufacturing method as claimed in claim 1, wherein in the attaching step, the lamellar board is a wood board or a fiber board.

4. The manufacturing method as claimed in claim 1, wherein in the cutting step, two or more of the longitudinal grooves are cut simultaneously in a single cutting process.

5. The manufacturing method as claimed in claim 1, wherein in the cutting step, each of the lamellar strips has a trapezoidal cross-sectional shape, a semicircular cross-sectional shape, a trapezoidal cross-sectional shape with chamfers, or a rectangular cross-sectional shape with chamfers.

* * * * *